Feb. 9, 1971  C. C. NE HODA  3,561,151
HOLLOW TRANSPARENT FISH LURE
Filed April 25, 1969

INVENTOR:
CHARLES C. NE HODA
BY
Elliott & Pastoriza,
ATTORNEYS

United States Patent Office 3,561,151
Patented Feb. 9, 1971

3,561,151
HOLLOW TRANSPARENT FISH LURE
Charles C. NeHoda, 127 San Benito,
Ventura, Calif. 93001
Filed Apr. 25, 1969, Ser. No. 819,301
Int. Cl. A01k *83/02*
U.S. Cl. 43—35                                6 Claims

ABSTRACT OF THE DISCLOSURE

A fish lure in the form of an elongated cylindrical hollow member preferably transparent and provided with a removable nose piece for enabling bait to be inserted in the hollow interior of the member. Wall portions of the member include slots through which hooks disposed normally within the member are caused to pass through when a line passing into a rear partition in the member and attached to the hooks is pulled to move the hook means within the member. The hook means are thus normally encased within the member but when a fish bites on the lure, the line tension causes the hook means to be exteriorly exposed to snag the fish.

---

This invention relates to improved fishing lures.

BACKGROUND OF THE INVENTION

Most presently available fishing lures take the form of "spoons," artificial structures simulating fish, and other equivalent objects which in many instances may be highly reflective or of bright colors to attract fish. These lures include hooks for snagging the fish, bait normally being inserted on the hooks in the usual manner.

With the foregoing types of fishing lures, the bait must normally be manually urged onto the lure hooks. This manner of holding the bait limits the use of various baits such as salmon eggs and the like since the latter are very difficult to support on a hook. Even bait properly supported on a hook can become lost during the fishing operation.

In addition to the above problems, the actual physical handling of the bait and inserting the same on the hook as well as physically handling the fish lure itself with the hook is time consuming and often annoying to a fisherman. Not only is the type of bait usable limited as pointed out above, but in addition, the fisherman can easily snag his fingers on the hook itself while depositing the bait.

BRIEF DESCRIPTION OF THE PRESENT INVENTION

The present invention contemplates an improved fish lure wherein the foregoing problems associated with conventional lures and fish hooks are wholly avoided.

More particularly, the fish lure of the present invention constitutes an elongated member preferably transparent and of cylindrical shape having a hollow interior. One end of the member includes a removable nose piece to provide access to the interior. A partition closes the other end of the member and defines a longitudinal guide bore passing from the exterior to the interior of the member. The lateral side wall of the member includes elongated slot means. Within the interior of the member thee is disposed a hook means having an integally extending rod portion defining an arm means passing through the guide bore to the exterior of the lure. A fishing line is secured to the exposed portion of the arm means.

With the foregoing arrangement, tension on the fishing line will pull the arm means through the elongated bore thereby causing the hook means to project upwardly through the slot means and thus be exteriorly exposed for snagging a fish. In addition, by removing the removable nose piece, any type of bait alive or dead even including salmon eggs may readily be placed in the interior of the member and the nose piece reinserted so that there is no chance of losing the bait. In addition, conventional type lures such as "spoons" or other shiny metallic objects or even colored plastic articles may be disposed in the cylindrical member and since the member is transparent, these items will function in their usual manner to attract fish. Once a fish has attempted to bite on the member, the tension on the line will cause the hook means to protrude through the slots and snag the fish.

BRIEF DESCRIPTION OF THE DRAWINGS

A better understanding of the invention will be had by now referring to a preferred embodiment thereof as illustrated in the accompanying drawings in which.

DETAILED DESCRIPTION OF THE INVENTION

Figure 1:
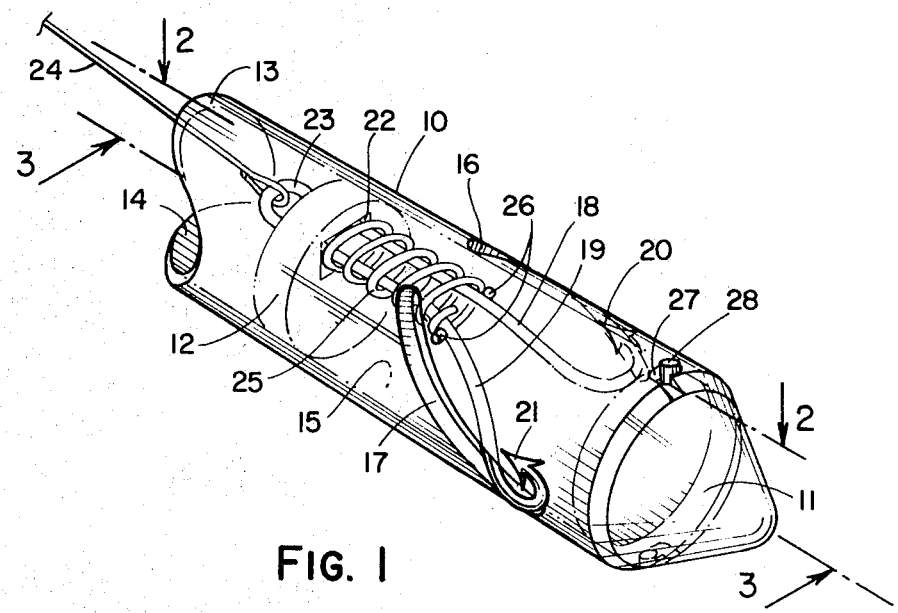
FIG. 1 is a perspective view of the improved fishing lure of this invention.

Referring to FIG. 1, there is shown a fish lure in the form of an elongated transparent member 10 having a removable nose piece 11 at its forward end and a partition 12 adjacent to its rear end. Diametrically-opposite cylindrical portions of the member extend rearwardly beyond the partition 12 to define rear wings 13 and 14 for the member. The space within the member between the nose piece 11 and partition 12 defines a hollow interior 15. Any items placed within this interior by removing the nose piece 11 will be visible in view of the transparency of the member itself.

As shown in FIG. 1, there are provided slot means in the form of two elongated slots 16 and 17 formed in the cylindrical wall of the member. First ends of these slots are disposed closer to the partition 12 than to the nose piece 11, the two slots then diverging from each other in a forward direction to terminate at substantially diametrically-opposite points on the member closer to the nose piece 11 than to the partition 12. Within the hollow interior 15 and cooperating with the slot means are arm means 18 and 19 curved back on themselves to define hook means 20 and 21. The extreme tips of the hook means are normally positioned at the referred-to second ends of the slots with substantially very little of the hook means projecting through the slots so that the hook means are essentially wholly contained within the member.

The arm means extend integrally from the hook means in curved paths to pass through a guide bore 22 formed in the partition 12. The protruding or exterior portion of these arm means connect together as at 23 and a suitable fishing line 24 may be connected to the arm means at this point.

The assembly is completed by provision of a compression spring 25 captured between the peripheral portion of the partition 12 at the exit point of the arms into the interior of the member and suitable nub type stops 26 formed on the arms. With this arrangement, the spring 25 will bias the hook means towards the front of the lure in fully-inserted positions within the member.

The forward end of the cylindrical member 10 and the nose piece 11 are provided with bayonet slot and pin means 27 and 28, respectively, on diametrically-opposite sides to securely hold the nose piece to the forward end of the member when the device is used.

Figure 2:
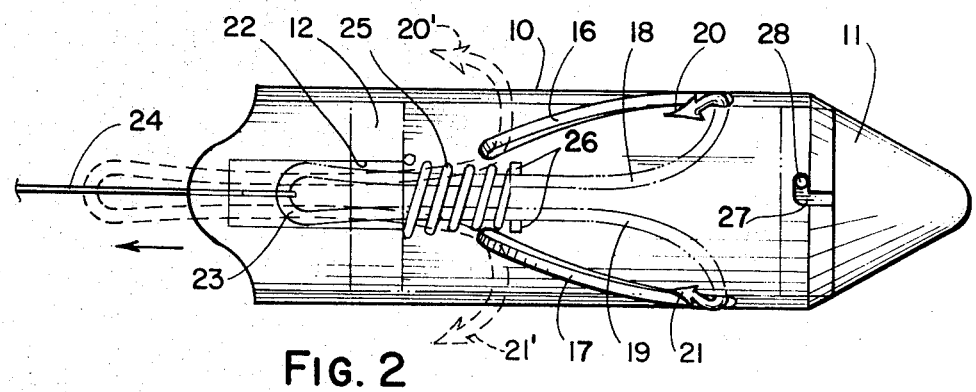
FIG. 2 is a top plan view taken generally in the direction of the arrows 2—2 of FIG. 1; and, FIG. 3 is a partial cross section taken generally in the direction of the arrows 3—3 of FIG. 1.

The configuration of the slot means in the form of the slots 16 and 17, the arm means 18 and 19 and the hook means 20 and 21 will be clear by reference to FIG. 2 illustrating the arrangement in top plan view. In this view, it will be clear that in the normal position of the hook means within the member, there are not exposed any appreciable portions of the exterior hook tips. On the other hand, when a tension is applied to the line 24 to pull on the arm means, the hooks 20 and 21 will pass along and up through the slots 16 and 17 to assume the dotted line positions indicated at 20' and 21', wherein they are fully exteriorly exposed.

Figure 3:
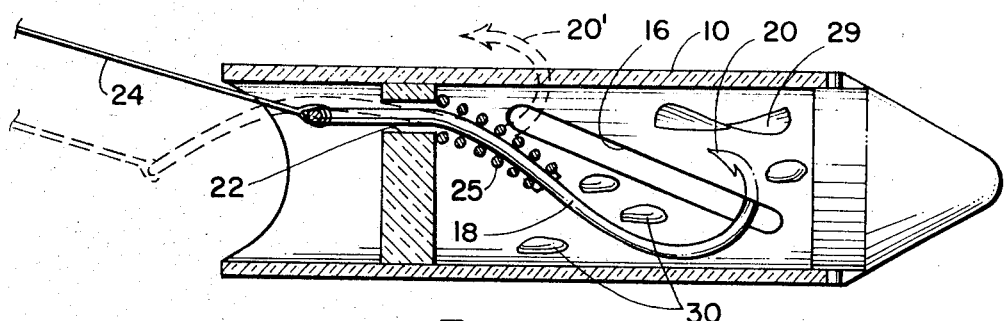

The foregoing described action will be better understood by reference to the partial cross-sectional view of FIG. 3 wherein the curving of the arm 18 and the turning back thereof to define the hook 20 cooperating with the slot 16 is more clearly shown. Again there is illustrated a dotted line position for the hook when tension is applied to the line 24 to compress the spring 25. The axis of the guide bore 22 is parallel to the axis of the cylindrical member. Accordingly, when a pulling force is applied to the arm 18, to guide the same through the guide bore 22, the curvature of the arm will result in the hook end portion 20 tending to move outwardly or radially away from the axis of the cylindrical member. The guiding by the bore 22 in cooperation with the guiding by the slot 16 will result in the hook 20 being fully exposed when the arm portion thereof is retracted through the bore against the bias of the spring 25.

FIG. 3 also illustrates various objects such as a shiny reflecting "spoon" 29 or equivalent element within the hollow interior. Also illustrated is bait 30 which may constitute salmon eggs, or small live fish, live worms, or similar bait. Because of the slots and guide bore, water will normally fill the interior of the member so that any live bait will remain in its normal environment and its own motion will serve to attract fish.

OPERATION

In operation, a fisherman may readily handle the member 10 without fear of snagging himself or his clothing inasmuch as the hook means are substantially wholly contained within the member. The nose piece 11 may readily be removed by rotating the same to uncouple the bayonet slot and pin arrangement and suitable bait may then be inserted into the interior of the member. Also, as mentioned, attracting elements or brightly-colored plastic objects may also be inserted.

With respect to the foregoing, it will be evident that there is no need to actually secure any type of bait to the hooks themselves but rather only place the same in the interior of the member.

After the bait and any other lures have been deposited in the member, the nose piece is secured to the front portion and the fisherman may then commence fishing in the usual manner.

When a fish bites on the member, the tension relative to the member will retract the hook means and arm portion thereof through the guide bore thereby causing the hooks to project outwardly through the slots and be fully exposed to snag the fish. The caught fish may then be reeled in in the usual manner.

The lure, of course, may then be used again to catch further fish.

From the foregoing description, it will be evident that the present invention has provided a greatly improved fishing lure wherein the various advantages of not having to actually put bait on the hooks and wherein the risk of losing bait is minimized as well as the fact that all types of bait, live or dead, may be used are realized.

While only one specific embodiment of the fishing lure has been set forth, the invention is not to be thought of as limited to the one example set forth merely for illustrative purposes.

What is claimed is:

1. A fish lure comprising: a hollow transparent elongated member having slot means formed in a wall portion of said member; hook means normally disposed in said member; an end portion of said member being removable to provide access to the interior of said member so that bait may be placed in said member; a guide bore in said member opposite the removable end for connecting a fishing line to a portion of said hook means; and arm means forming integral extensions of said hook means passing through said guide bore so that said fishing line may be secured to the exterior portions of said arm means such that pulling on said line moves said hook means through said slot means to expose the same on the exterior of said member.

2. A fish lure comprising, in combination: an elongated transparent member having a hollow interior; a removable nose piece in one end of said member to provide access to said interior; a partition adjacent to the other end of said member having a longitudinal guide bore passing therethrough, the wall of said member between said nose piece and partition having an elongated slot means; and arm means passing through said bore into said interior, the exterior end of said arm means being adapted for connection to a fishing line and the interior end of said arm means curving back on itself to define hook means normally disposed within said interior, tension on said line, when said member is held, causing said arm means to retract in said guide bore to move said hook means along and through said slot means so that said hook means projects through said slot means to be exposed for snagging a fish.

3. The subject matter of claim 2, in which said member is of cylindrical shape and in which said slot means comprises two slots having first ends closer to said partition than to said nose piece, said slots diverging from each other in a direction towards said nose piece to terminate in second ends closer to said nose piece than to said partition at points substantially on diametrically opposite sides of said cylindrical shape, said arm means comprising first and second rods connected together at the ends exterior to said partition, said rods respctively curving downwardly at their exit ends from said guide bore relative to the axis of said cylindrical shape, and then turning back to define said hook means, the tips of said hook means being received in said second ends of said slots respectively so that retracting of said arm means results in said guide bore and slots guiding said hook means to their exposed positions.

4. The subject matter of claim 3, including a compression spring disposed about said rods at their exit points from said bore to bias said hook means to their fully inserted position in said interior.

5. The subject matter of claim 3, in which diametrically opposite cylindrical wall portions of said cylindrical shape extend rearwardly beyond said partition to define rear wings for said member.

6. The subject matter of claim 3, in which said removable nose piece and forward portion of said member include bayonet slot and pin means for securing said nose piece to said member.

References Cited

UNITED STATES PATENTS

| 519,684 | 5/1894 | Goff et al. | 43—35 |
| 913,102 | 2/1909 | Burke | 43—35 |
| 1,101,655 | 6/1914 | Ness | 43—41 |
| 1,372,831 | 3/1921 | Roderick | 43—35 |
| 1,486,028 | 3/1924 | Meighen | 43—35 |
| 1,670,174 | 5/1928 | Wiersma | 43—35 |
| 2,081,671 | 5/1937 | Lauer | 43—41 |
| 3,266,185 | 8/1966 | Abramson | 43—35 |

SAMUEL KOREN, Primary Examiner

D. J. LEACH, Assistant Examiner

U.S. Cl. X.R.

43—37, 41, 42.06, 42.33, 42.35